(12) United States Patent
Leach

(10) Patent No.: US 6,981,645 B2
(45) Date of Patent: Jan. 3, 2006

(54) DRIVE CIRCUIT FOR CONTROLLING A RESONANT MOTOR

(75) Inventor: Robert J. Leach, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 175 days.

(21) Appl. No.: 10/657,690

(22) Filed: Sep. 8, 2003

(65) Prior Publication Data

US 2005/0051632 A1    Mar. 10, 2005

(51) Int. Cl.
*G02B 26/10*    (2006.01)

(52) U.S. Cl. .................... 235/462.25; 235/472.01; 310/68 B; 310/68 R; 318/459; 318/500; 318/727

(58) Field of Classification Search .......... 235/462.25, 235/472.01; 310/68 B, 68 R; 318/459, 318/500, 727
See application file for complete search history.

(56) References Cited

U.S. PATENT DOCUMENTS

| | | | |
|---|---|---|---|
| 5,003,164 A | | 3/1991 | Barkan |
| 5,126,545 A | | 6/1992 | Barkan |
| 5,266,787 A | * | 11/1993 | Mazz et al. ............ 235/462.25 |
| 5,280,163 A | * | 1/1994 | Barkan .................. 235/462.36 |
| 5,550,364 A | * | 8/1996 | Rudeen .................. 235/462.34 |
| 5,736,797 A | | 4/1998 | Motohashi et al. |
| 6,037,740 A | * | 3/2000 | Pollock et al. .............. 318/701 |
| 6,259,179 B1 | * | 7/2001 | Fukuyama et al. ........ 310/90.5 |
| 6,394,579 B1 | * | 5/2002 | Boyd et al. ................... 347/47 |

FOREIGN PATENT DOCUMENTS

| | | |
|---|---|---|
| EP | 0 652 632 B1 | 5/1995 |
| EP | 1 096 660 A2 | 2/2001 |

OTHER PUBLICATIONS

Copy of International Search Report.

* cited by examiner

*Primary Examiner*—Diane I. Lee
*Assistant Examiner*—Seung H Lee
(74) *Attorney, Agent, or Firm*—Carter, DeLuca Farrell & Schmidt, LLP

(57) ABSTRACT

A drive circuit for operating a resonant motor includes a motor circuit, a feedback circuit, a control circuit, and a coil drive circuit. A feedback loop includes the motor circuit, the feedback circuit, and the control circuit. The feedback loop in conjunction with the coil drive circuit monitors, maintains, and adjusts the oscillatory motion of the resonant motor. The drive circuit is suitable for operating a resonant motor of an optical code reader.

19 Claims, 3 Drawing Sheets

DRIVE CIRCUIT FOR CONTROLLING A RESONANT MOTOR

BACKGROUND OF THE INVENTION

1. Field of the Invention

This invention relates to circuitry for controlling motors, especially resonant motors. More particularly, the present invention relates to a drive circuit for controlling a resonant motor in an optical code reader.

2. Description of the Related Art

Resonant motors periodically oscillate in opposite rotary directions. These motors find use in many applications, including in optical code readers for moving a scanning mirror. Typically, the resonant motor operates at its own natural resonant frequency and requires a minimal input to maintain the oscillatory motion.

SUMMARY OF THE INVENTION

It is an aspect of the present invention to provide a drive circuit and method for operating a resonant motor using the drive circuit which provide better operating conditions than prior art drive circuits.

The present invention provides a drive circuit and method for operating a resonant, or oscillating, motor. The drive circuit includes a motor circuit, a feedback circuit, a control circuit, and a coil drive circuit. The motor circuit, the feedback circuit, and the control circuit are part of a feedback loop.

It is preferred that the drive circuit is adapted and configured for use with a resonant motor and it is further preferred that the motor circuit be included in the resonant motor. Additionally, the drive circuit is preferably configured and dimensioned to be incorporated within a hand-held optical code reader or scan module having a predetermined form factor, such as the SE900 and SE1200 form factors. Further, the drive circuit is preferably configured and adapted to be used with a SE1524 form factor.

The drive circuit of the present invention supplies a drive signal to a resonant, or oscillating, motor to initiate or maintain the resonant motor's oscillatory motion. The feedback circuit monitors the oscillatory motion of the motor and communicates this data to the control circuit as a feedback signal. The control circuit processes the feedback signal to generate a control signal and compares this control signal with a reference value to generate a switch signal in accordance with the result of the comparison.

The control signal is coupled to the coil drive circuit for controlling the generation of the drive signal. The drive signal is applied to an input of the resonant motor and preferably to a first, or drive, winding. Application of the drive signal causes the resonant motor to oscillate at its resonant frequency. A portion of the voltage present on the first winding is coupled to a second, or pick-up, winding.

An amplifier in the feedback circuit receives the output of the second winding and generates the feedback signal. When the control circuit generates the control signal, it simultaneously generates a switch signal that is coupled to an input of a switch. The switch is positioned in series with a first input of the amplifier. When the switch signal is not applied to the switch, the switch operates in a second, or open, state, thereby substantially isolating the amplifier from the second winding. When the switch signal is applied, the switch operates in a first, or closed, state whereby the voltage on the second winding is coupled to first and second inputs of the amplifier.

The feedback loop monitors and controls the oscillatory motion of the resonant motor. Additionally, the feedback loop regulates the generation of the drive signal that controls the resonant motor's maximum angular velocity. If the maximum angular velocity is at least a certain rate, the control circuit does not generate the control or switch signals. If the maximum angular velocity is below the desired rate, the control circuit simultaneously generates the control signal and the switch signal. By using the feedback loop in combination with the coil drive circuit, the drive circuit can continuously monitor, maintain, and adjust the resonant motor's motion.

A method for controlling a resonant motor in accordance with the present invention in the field of optical code reading includes aiming an optical code reader, which includes the resonant motor and the drive circuit, at an optical code. Actuating the optical code reader to energize the drive circuit and generate an initial drive signal to start the resonant motor oscillating during an optical code read operation. The feedback loop monitors and controls the oscillatory motion of the resonant motor as described hereinabove during the optical code read operation.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
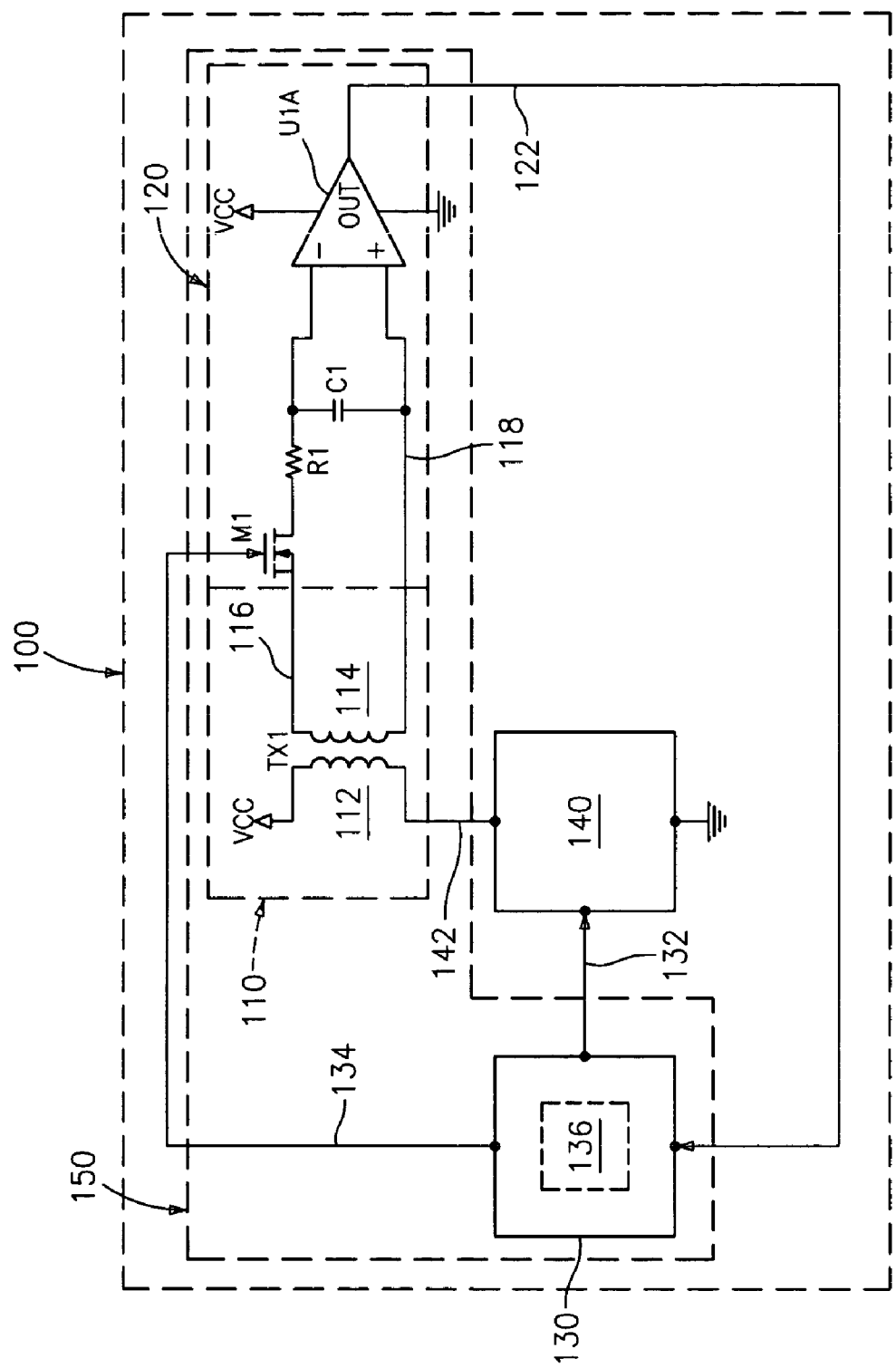
FIG. 1 is a block diagram of a drive circuit for a resonant motor in accordance with the present invention.
Figure 2:
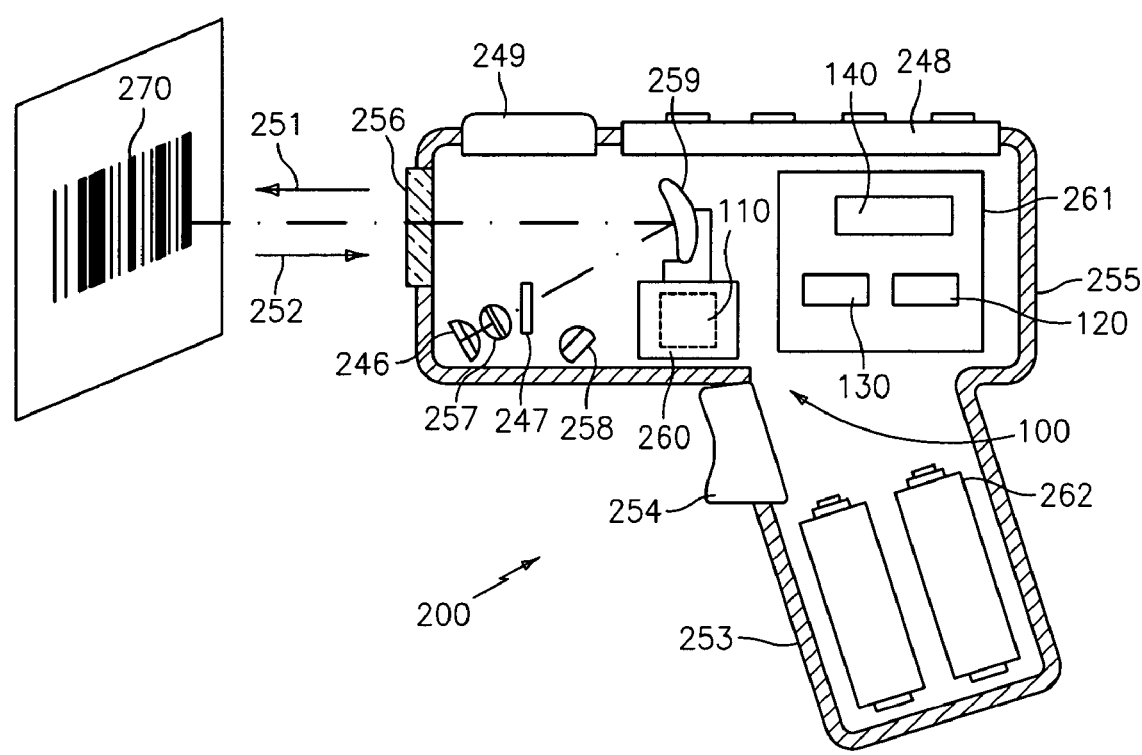
FIG. 2 is a side view of an optical code reader including the drive circuit of FIG. 1.
Figure 3:
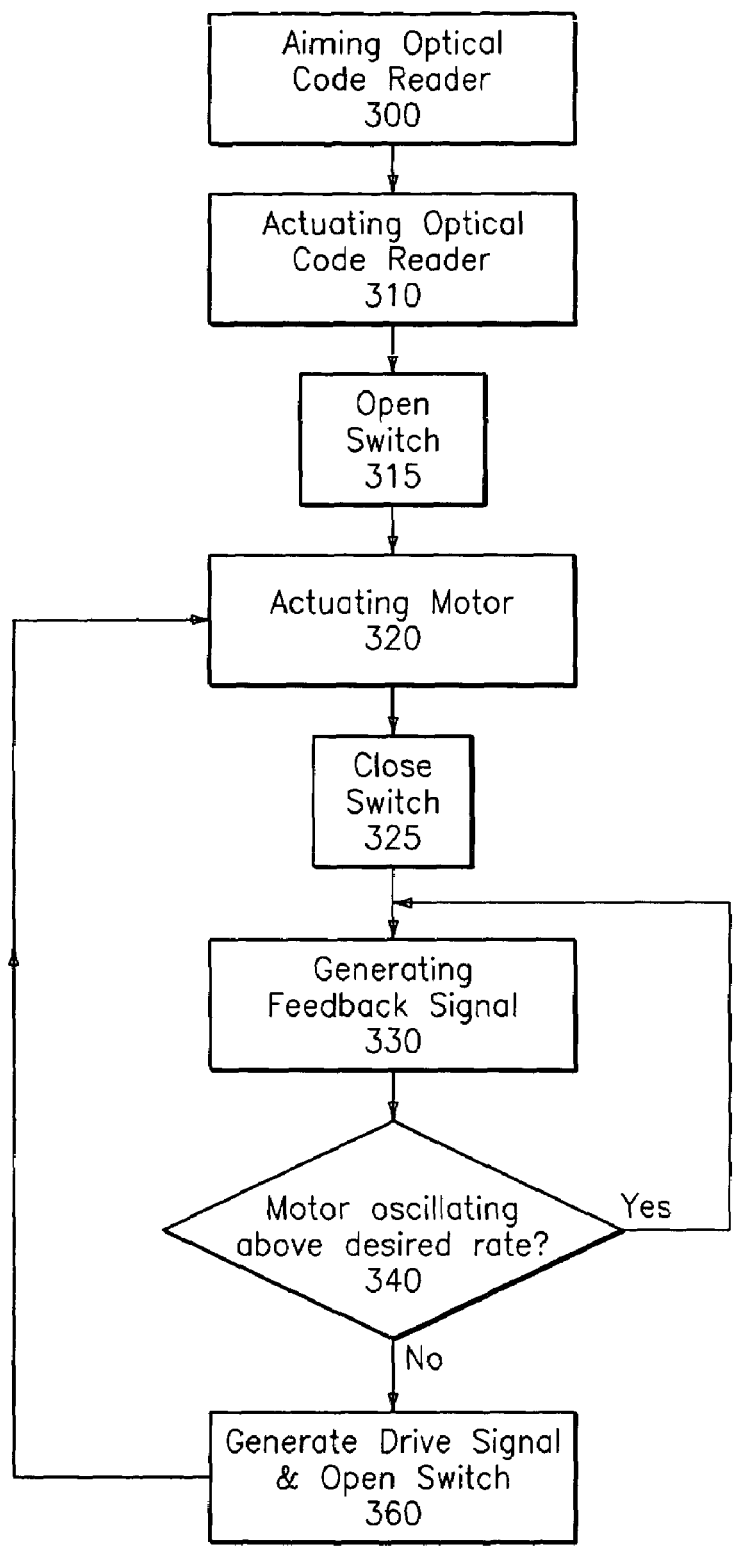
FIG. 3 is a flow chart of a method of operation using the drive circuit shown in FIG. 1 and the optical code reader shown in FIG. 2 in accordance with the present invention.

With reference to FIGS. 1 and 2, there is illustrated a drive circuit for a resonant motor designated generally by reference numeral 100 in accordance with the present invention. FIG. 3 illustrates a flow chart of a method of operation using the drive circuit 100. The drive circuit 100 is configured and dimensioned for being incorporated in devices having resonant motors, such as optical code readers. Further, the drive circuit 100 is configured and adapted to be used with a SE1524 resonant motor.

The drive circuit 100 in accordance with the present invention is especially suited and described herein for incorporation in optical code readers used for scanning and reading optical codes, such as barcodes. Preferably, the drive circuit 100 is configured and dimensioned to fit within a conventional form factor of an optical code reader 200 (see FIG. 2) or scan modules, such as the SE900, SE1200, and SE1524 form factors.

The drive circuit 100, as shown in FIGS. 1 and 2, includes a motor circuit 110, a feedback circuit 120, a control circuit 130, and a coil drive circuit 140. The drive circuit 100 further includes a feedback loop 150 which includes the motor circuit 110, the feedback circuit 120, and the control circuit 130.

The motor circuit 110 includes a first, or drive, winding 112 and a second, or pick-up, winding 114. In one embodiment, the drive winding 112 and the pick-up winding 114 are disposed on a single bobbin (not shown), thereby creating a transformer between the windings 112, 114, which is represented as TX1 in FIG. 1.

In a preferred embodiment, the motor circuit 110 is configured and dimensioned to fit within a resonant motor 260 of an optical code reader 200 as shown in FIG. 2. A resonant, or oscillating, motor rotates between a first, or starting, position and a second, or ending, position at the resonant motor's natural frequency. Typically, an initial signal is applied to the resonant motor to initiate the oscillations. After the signal to initiate the oscillatory motion, the motor's maximum angular rotation exponentially decreases due to energy losses of the motor. Another drive signal that is synchronized with the resonant motor's natural frequency is applied to the resonant motor to maintain the desired oscillatory motion.

An example of a resonant drive circuit is disclosed in U.S. Pat. No. 5,019,764 to Chang, assigned to Symbol Technologies, Inc. The motor includes a permanent magnet rotor, DC stator windings, AC stator windings, and a motor shaft. Another resonant drive circuit is disclosed in U.S. Pat. No. 5,280,163 to Barkan, also assigned to Symbol Technologies, Inc. The motor includes a permanent magnet, drive winding, pickup winding, and a leaf spring. A resonant motor of this type is disclosed in U.S. Pat. No. 5,262,627 to Shepard, and U.S. Pat. Nos. 5,825,013 & 5,923,025 to Dvorkis et al, also assigned to Symbol Technologies, Inc. The entire contents of these patents are incorporated herein by reference.

Operatively coupled to the motor circuit 110 is the feedback circuit 120 that includes an amplifier U1A, a resistor R1, and a capacitor C1. Further, included in the feedback circuit 120 is a switch M1 connected in series with the pick-up winding 114. The switch M1 is operable in a first, or closed, state and a second, or open, state where the switch M1 is switchable between the first and second states in response to an input. Preferably, the switch M1 is a transistor. The feedback circuit 120 receives first and second outputs 116, 118 of the motor circuit 110 and generates a feedback signal 122 indicative of a difference between the first and second outputs 116, 118 when switch M1 is in the closed state. In a preferred embodiment, as shown in FIG. 1, the amplifier U1A includes at least two inputs for receiving both outputs 116, 118. In an alternate embodiment, the amplifier U1A has at least one input for receiving at least one of the first or second outputs 116, 118 of the motor circuit 110 when the other is referenced to ground potential and at least one output for the feedback signal 122.

Additionally, the feedback circuit 120 includes biasing circuitry for the amplifier U1A. The amplifier U1A of the feedback circuit 120 is coupled to an input of the control circuit 130 for transmitting the feedback signal 122 to the control circuit 130.

In the preferred embodiment, the feedback circuit 120 generates the feedback signal 122 by amplifying a voltage difference between the first and second outputs 116, 118. The amplifier U1A and associated biasing circuitry are selected to generate the feedback signal 122 that includes a voltage value indicative of the difference between the first and second outputs 116, 118.

The control circuit 130 receives the feedback signal 122 and processes it to generate a control signal 132 and a switching signal 134. In the preferred embodiment, the control circuit 130 includes a comparator 136 and associated circuitry. The control circuit 130 compares the voltage value of the control signal 132 to a reference voltage value and generates the switching signal 134. In one embodiment, the reference voltage value is stored in a data storage device, such as a memory module, accessible by the comparator 136. Alternatively, the reference voltage value may be stored in a data storage device of a processor, where the processor is operatively coupled to the comparator 136 of the control circuit 130. The control signal 132 is transmitted to the coil drive circuit 140 and, preferably, transmitted to an input of a transistor of the drive circuit 140. The switching signal 134 is transmitted to an input of switch M1.

During operation when the drive circuit 100 is energized, the voltage values of the first and second outputs 116, 118 are substantially equal whereby feedback circuit 120 outputs the feedback signal 122 having a minimum voltage value. The control circuit processes the minimum voltage value of the feedback signal 122. Since the voltage value of the feedback signal 122 is less than the desired value, the control circuit 130 simultaneously generates the control signal 132 and the switch signal 134.

The switch M1 has a predetermined threshold value that determines when it operates in the first, or closed, state and when it operates in the second, or open, state. When a voltage value of the switch signal 134 is greater than the threshold value, the switch M1 will operate in the first state. Furthermore, when the voltage value of the switch signal 134 is equal to or less than the threshold value, the switch M1 will operate in the second state. The control circuit 130 operatively couples the switch signal 134 to the input of switch M1 where the switch signal 134 has a voltage value that is greater than the threshold value. Therefore, when the switch signal 134 is applied to the input of the switch M1, the switch M1 is operated in the first state. In a preferred embodiment, the switch M1 is a n-channel MOSFET transistor. In alternate embodiments, the switch M1 may be implemented using other transistor types as well as integrated electronic switches.

Initially, the switch M1 is in the first, or closed, state and the switch M1 conducts the first output 116 from the second winding 114 of the motor circuit 110 to the resistor R1. The resistor R1 is disposed in series between the first input of amplifier U1A and a node of the switch M1. Another node of switch M1 is serially connected to the second winding 114. The second output 118 is serially coupled to the second input of amplifier U1A. As the first output 116 is conducted to the resistor R1, the capacitor C1 begins to charge.

In the second, or open, state, switch M1 does not conduct the first output 116 from the second, or pick-up, winding 114 to the amplifier U1A. When switch M1 is in the second state, the capacitor C1 stops charging, but will maintain a voltage value that is substantially equal to its voltage value when switch M1 opens. Therefore, capacitor C1 acts as a holding capacitor. As a holding capacitor, the capacitor C1 maintains a constant voltage differential between the first and second inputs of the amplifier U1A. Therefore, the amplifier U1A produces the feedback signal 122 having a substantially constant voltage value that is indicative of the voltage difference between the first and second inputs.

Since the switching signal 134 has an insufficient voltage value to cause the switch M1 to operate in the first state, resistor R1, capacitor C1, and amplifier U1A are substantially isolated from the second winding 114. By isolating the amplifier U1A of the feedback circuit 120 during generation of the drive pulse 142, any voltages induced on the second winding 114 by the drive pulse 142 are substantially isolated from the amplifier U1A. Therefore, the output of amplifier U1A (i.e. feedback signal 122) will be substantially a sinusoidal waveform.

The coil drive circuit 140 includes a transistor and associated circuitry. Preferably, the transistor is a power MOSFET and the associated circuitry includes biasing circuitry for the transistor. In addition, the coil drive circuit 140 provides a motor drive signal 142 that is operatively coupled to the first, or drive, winding 112 of the motor circuit 110. The control signal 132 is operatively coupled to an input of the transistor for controlling the motor drive signal 142 as discussed in detail hereinafter. The output of the transistor, or motor drive signal 142, is operatively coupled to the first or drive winding 112.

More specifically, the transistor will conduct current according to a voltage value of the control signal 132. The transistor and biasing circuitry establish a baseline voltage value. When the voltage value of the control signal 132 is at or above the baseline voltage value, the transistor will conduct current and produce the motor drive signal 142. In turn, the motor drive signal 142 is operatively coupled to the drive winding 112 of the motor circuit 110 and causes motion of the resonant motor 260 (FIG. 2) at its resonant frequency.

The resonant motor 260 further includes a magnet that induces a voltage that is present on winding 112 and winding 114. The value of this voltage is representative of the angular velocity of the resonant motor 260. In turn, this voltage value is communicated to the amplifier U1A as first and second outputs 116, 118. According to a preferred embodiment, the first and second outputs 116, 118 are series coupled to the first and second inputs respectively of amplifier U1A. In addition, the switch M1 and the resistor R1 are placed in series with the first input 116 of amplifier U1A while the capacitor C1 is disposed in parallel to the first and second inputs 116, 118. The capacitor C1 begins to store a voltage, or charge, due to the voltage value on the second 114 winding.

As the oscillation rate of the resonant motor 260 decreases, the voltage of the induced signal of the second winding 114 also decreases. This results in a smaller difference between the voltage values of the first and second outputs 116, 118. As the difference between the voltage values of the first and second outputs 116, 118 decreases, the amplifier U1A produces a feedback signal 122 having a smaller voltage value. The feedback signal 122 is representative of the angular velocity of the resonant motor 260.

While the voltage value of the feedback signal 122 is greater than the desired voltage value, the control circuit 130 is inhibited from generating the control and switch signals 132, 134. Once the feedback signal 122 reaches the desired value (i.e. a value that is determined during the time of manufacture), the control circuit 130 simultaneously generates the control and switch signals 132, 134 once every cycle of the resonant motor to compensate for the losses during the previous cycle. As discussed in detail hereinabove, the switch signal 134 causes the switch M1 to operate in the second state and the control signal 132 causes the coil drive circuit 140 to generate a drive pulse 142.

The feedback loop 150 monitors the motion of the resonant motor 260 by applying the first and second outputs 116, 118 to the first and second inputs of the amplifier U1A to generate a feedback signal 122. The feedback signal 122 includes a voltage value that is representative of the angular velocity of the resonant motor 260. As the maximum angular velocity decreases, the voltage value of feedback signal 122 also decreases. This decreased voltage value is compared to the desired voltage value by the control circuit 130. Once the voltage value of the feedback signal 122 is less than or equal to the desired voltage value, the control circuit 130 simultaneously generates the control signal 132 and the switch signal 134. The control and switch signals 132, 134 are coupled to the coil drive circuit 140 and the switch M1 as discussed hereinabove.

FIG. 2 illustrates the drive circuit 100 disposed within the optical code reader 200. An outgoing light beam 251 is generated in the optical code reader 200, usually by a laser diode or the like, e.g., a laser light source 246, and directed to impinge upon an optical target 270, such as a barcode symbol, disposed in front of the optical code reader 200. The outgoing beam 251 is scanned in a scan pattern, and the user positions the hand-held unit so the scan pattern traverses the optical target 270. A light beam 252 reflected by the optical target 270 is detected by a light-responsive device 258 having associated circuitry for generating at least one data signal corresponding to data components of the reflected light beam 252. The data signal can then be processed and decoded as is known in the art.

The optical code reader 200 is a gun shaped device having a pistol-grip type of handle 253, and a movable trigger 254 to allow the user to activate the light beam 251 and detector circuitry, thereby saving battery life if the unit is self-powered. A lightweight plastic housing 255 contains the laser light source 246, the detector 258, the optics and signal processing circuitry, and the power source or battery 262. A light-transmissive window 256 in the front end of the housing 255 allows the outgoing light beam 251 to exit and the incoming reflected light 252 to enter. The optical code reader 200 is designed to be aimed at the optical target 270 by the user from a position in which the optical code reader 200 is spaced from the optical target 270, i.e., not touching the optical target 270. Typically, this type of hand-held bar code reader can scan and decode an optical target lying 2 to 60 inches from the optical code reader.

A suitable lens 257 (or multiple lens system) may be used to focus the scanned beam onto the optical target 270 via a partially silvered mirror 247 and an oscillating mirror 259 which is driven by the drive circuit 100 of the present invention. The drive circuit 100 is operatively coupled to the resonant motor 260 and activated when the trigger 254 is actuated. If the light produced by the source 246 is not visible, an aiming light, if needed, produces a visible-light spot, which may be fixed, or scanned just like the laser beam; the user employs this visible light to aim the reader unit at the symbol before actuating the trigger 254.

In particular, components of the drive circuit 100 are advantageously disposed within the optical code reader 200 as follows. The motor circuit 110 is disposed within the resonant motor 260 while the feedback circuit 120, the control circuit 130, and the coil drive circuit 140 are disposed on a printed circuit board 261 within the optical code reader 200.

By using the feedback loop 150 in conjunction with the coil drive circuit 140 to monitor and control the oscillatory motion of the resonant motor 260, the drive circuit 100 maintains a substantially constant scan angle and/or scan amplitude of the optical code reader 200.

The flow chart of FIG. 3 illustrates an exemplary method according to the present invention with respect to the optical code reader 200. At step 300, the operator aims the optical code reader 200 at the optical target 270. The optical code reader 200 is actuated in step 310 via the trigger 254. Upon activation of the optical code reader 200, the light source 246 generates the outgoing beam 251 and scans the optical target 270. More particularly, the light source 246 impinges its output on the oscillating mirror 259 that is operatively coupled to the resonant motor 260. Concurrent with the activation of the optical code reader 200, at steps 315 and 320, the drive circuit 100 is energized, opens the switch, and generates the drive pulse 142 that causes the resonant motor 260 to start oscillating at the motor's resonant frequency as discussed previously. After the drive pulse is terminated, the switch is closed at step 325.

As the resonant motor 260 oscillates, the feedback circuit 120 generates a feedback signal 122 in step 330 that is representative of the resonant motor's motion. As the motor's motion decreases, it results in a decreased voltage value in the feedback signal 122. The voltage value of the feedback signal 122 is compared to the desired voltage value stored in the control circuit 130 in step 340. If the voltage value of the feedback signal 122 is greater than the desired voltage value stored in control circuit 130, it is indicative that the resonant motor 260 is oscillating above a minimum angular rotation. Therefore the control circuit 130 does not generate the drive signal 132 or the switch signal 134 and switch M1 remains in the first, or closed, state. As switch M1 is in the first state, the voltage from the second winding 114 is applied to the first and second inputs of the amplifier U1A to generate the feedback signal 122.

If, however, the voltage value of the feedback signal 122 is less than or equal to the desired voltage value stored in control circuit 130, the control circuit 130 simultaneously generates the control and switch signals 132, 134 in step 360. The control signal 132 causes coil drive circuit 140 to generate drive signal 142 that is coupled to the first winding 112 of the motor circuit. The drive signal 142 causes the resonant motor 260 to oscillate at the motor's resonant frequency. Simultaneously, the switch signal 134 is applied to the input of the switch M1 causing the switch M1 to operate in the second, or open, state. Therefore, any voltage coupled to the second winding 114 from the drive pulse 142 or first winding is substantially isolated from the first and second inputs of the amplifier U1A.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A drive circuit for operating a resonant motor having associated motor circuitry, including a first winding and a second winding, the drive circuit comprising:
   a coil drive circuit configured to operatively couple to the first winding of the motor circuitry for supplying a drive signal thereto;
   a feedback circuit including at least a switch operable in a first and a second state and configured to operatively couple to the second winding; and
   a control circuit operatively coupled to the switch and the coil drive circuit for providing a switching signal to said switch for switching between said first and second states, said control circuit providing a control signal to said coil drive circuit in response to a feedback signal received from said resonant motor, wherein a voltage value of said feedback signal varies when said switch is in the first state, and said voltage value of said feedback signal is held substantially constant when said switch is in the second state.

2. The drive circuit of claim 1, wherein said first winding is a drive winding, said second winding is a pick-up winding, and said switch is a transistor.

3. The drive circuit of claim 1, wherein said feedback circuit further includes an amplifier having at least one input, a resistor coupled in series to said amplifier, and a capacitor coupled in parallel to said amplifier, the amplifier providing said feedback signal to said control circuit.

4. The drive circuit of claim 3, wherein during operation of the switch in the second state, the resistor, capacitor and amplifier are substantially isolated from the second winding, and wherein the output of the amplifier during operation of the switch in the second state is substantially a sinusoidal waveform.

5. The drive circuit of claim 1, wherein said control circuit includes a comparator for comparing a voltage value of said control circuit to a reference voltage value and for generating said switching signal according to the comparison.

6. The drive circuit of claim 5, wherein said reference voltage value is stored in a data storage device of a processor operatively coupled to said control circuit.

7. The drive circuit of claim 1, wherein said switch is a transistor and said voltage value is indicative of the voltage across a capacitor in the feedback circuit.

8. An improved optical code reader of the type having a laser light source for generating a laser output beam for scanning an optical code located in one of a plurality of focal planes of said optical code reader; an oscillating mirror for reflecting and directing the laser output beam in a direction suitable for reading said optical code; a resonant motor having associated circuitry, including a first winding and a second winding, for controlling the oscillation of said oscillating mirror; and a photo detector for detecting a reflection beam corresponding to the laser output beam reflected by said optical code, said photo detector having associated circuitry for generating a data signal corresponding to data components of said reflection beam, said improved optical code reader comprising:
   a drive circuit for driving said resonant motor, said drive circuit comprising:
      a coil drive circuit operatively coupled to the first winding for supplying a drive signal thereto;
      a feedback circuit including at least a switch operable in a first and a second state and operatively coupled to the second winding; and
      a control circuit operatively coupled to the switch and the coil drive circuit for providing a switching signal to said switch for switching between said first and second states, said control circuit providing a control signal to said coil drive circuit in response to a feedback signal received from said resonant motor, wherein said control circuit includes a comparator for comparing a voltage value of said control circuit to a reference voltage value and for generating said switching signal according to the comparison.

9. The optical code reader of claim 8, wherein said first winding is a drive winding, said second winding is a pick-up winding, and said switch is a transistor.

10. The optical code reader of claim 8, wherein a voltage value of said feedback signal, generated by the feedback circuit, varies when said switch is in the first state, and said voltage value of said feedback signal is held substantially constant when said switch is in the second state.

11. The optical code reader of claim 10, wherein said switch is a transistor and said voltage value is indicative of the voltage across a capacitor in the feedback circuit.

12. The optical code reader of claim 8, wherein said feedback circuit includes an amplifier having at least one input, a resistor coupled in series to said amplifier, and a capacitor coupled in parallel to said amplifier, the amplifier providing said feedback signal to said control circuit.

13. The optical code reader of claim 12, wherein said reference voltage value is stored in a data storage device of a processor operatively coupled to said control circuit.

14. The optical code reader of claim 12, wherein during operation of the switch in the second state, the resistor, capacitor and amplifier are substantially isolated from the second winding, and wherein the output of the amplifier during operation of the switch in the second state is substantially a sinusoidal waveform.

15. A method for operating a resonant motor having associated motor circuitry, including a first winding and a second winding, the method comprising the steps of:
 applying a drive signal to said first winding of said resonant motor;
 determining a voltage value of a feedback signal generated by said associated circuitry coupled to said second winding of said resonant motor;
 processing the voltage value; and
 varying current supplied to said resonant motor in accordance with said processing by switching a switch operatively coupled to said second winding of said resonant motor, wherein a voltage value of said feedback signal varies when said switch is in a first state, and said voltage value of said feedback signal is held substantially constant when said switch is in a second state.

16. The method of claim 15, wherein said first winding is a drive winding and said second winding is a pick-up winding.

17. The method of claim 15, wherein during operation of the switch in the second state, a resistor, a capacitor and an amplifier are substantially isolated from the second winding, and wherein the output of the amplifier during operation of the switch in the second state is substantially a sinusoidal waveform.

18. The method of claim 15, wherein said switch is controlled by using a comparator for comparing said drive signal, or a processed version, with a reference voltage value.

19. The method of claim 15, wherein a step of turning off current to said resonant motor coincides with the closing of a transistor operatively coupled to said second winding of said resonant motor.

* * * * *